(12) United States Patent
Hsieh

(10) Patent No.: US 8,427,914 B2
(45) Date of Patent: Apr. 23, 2013

(54) LENS PULL-IN METHOD FOR NEAR-FIELD OPTICAL ACCESSING SYSTEM

(75) Inventor: Tung-Hsu Hsieh, Hsinchu (TW)

(73) Assignee: Lite-On It Corp., Taipei (TW)

( * ) Notice: Subject to any disclaimer, the term of this patent is extended or adjusted under 35 U.S.C. 154(b) by 0 days.

(21) Appl. No.: 12/985,147

(22) Filed: Jan. 5, 2011

(65) Prior Publication Data

US 2011/0261662 A1 Oct. 27, 2011

(30) Foreign Application Priority Data

Apr. 23, 2010 (CN) .......................... 2010 1 0166820

(51) Int. Cl.
*G11B 7/00* (2006.01)
*G11B 5/58* (2006.01)

(52) U.S. Cl.
USPC ................ 369/44.34; 369/44.23; 369/44.32; 369/53.23

(58) Field of Classification Search ............... 369/44.23, 369/44.32, 53.23, 44.34
See application file for complete search history.

(56) References Cited

U.S. PATENT DOCUMENTS

| 2006/0280063 | A1* | 12/2006 | Ishimoto | .................. 369/44.34 |
| 2009/0016179 | A1 | 1/2009 | Jeong et al. | |
| 2009/0059753 | A1* | 3/2009 | Shin et al. | .................. 369/53.23 |
| 2009/0154309 | A1* | 6/2009 | Jeong et al. | ................. 369/44.32 |
| 2009/0175146 | A1* | 7/2009 | Lee et al. | ..................... 369/53.3 |
| 2009/0180372 | A1* | 7/2009 | Jeong et al. | ............. 369/112.23 |
| 2009/0290465 | A1 | 11/2009 | Park et al. | |

* cited by examiner

*Primary Examiner* — Aneeta Yodichkas
(74) *Attorney, Agent, or Firm* — WPAT PC; Justin King

(57) ABSTRACT

A lens pull-in method is used in a near-field optical accessing system. When a lens is in a far-field range, the lens is driven to approach a surface of an optical disc in an open loop control state. If the lens enters a near-field range, a first GES level is inputted as a set value and the lens is driven in a close loop control state. When the gap error signal decreases to the first GES level, the set value is changed to a second GES level, which is higher than the first GES level. When the gap error signal increases to the first GES level, the set value is changed to a target GES level, so that the gap error signal is maintained at the target gap error signal.

2 Claims, 9 Drawing Sheets

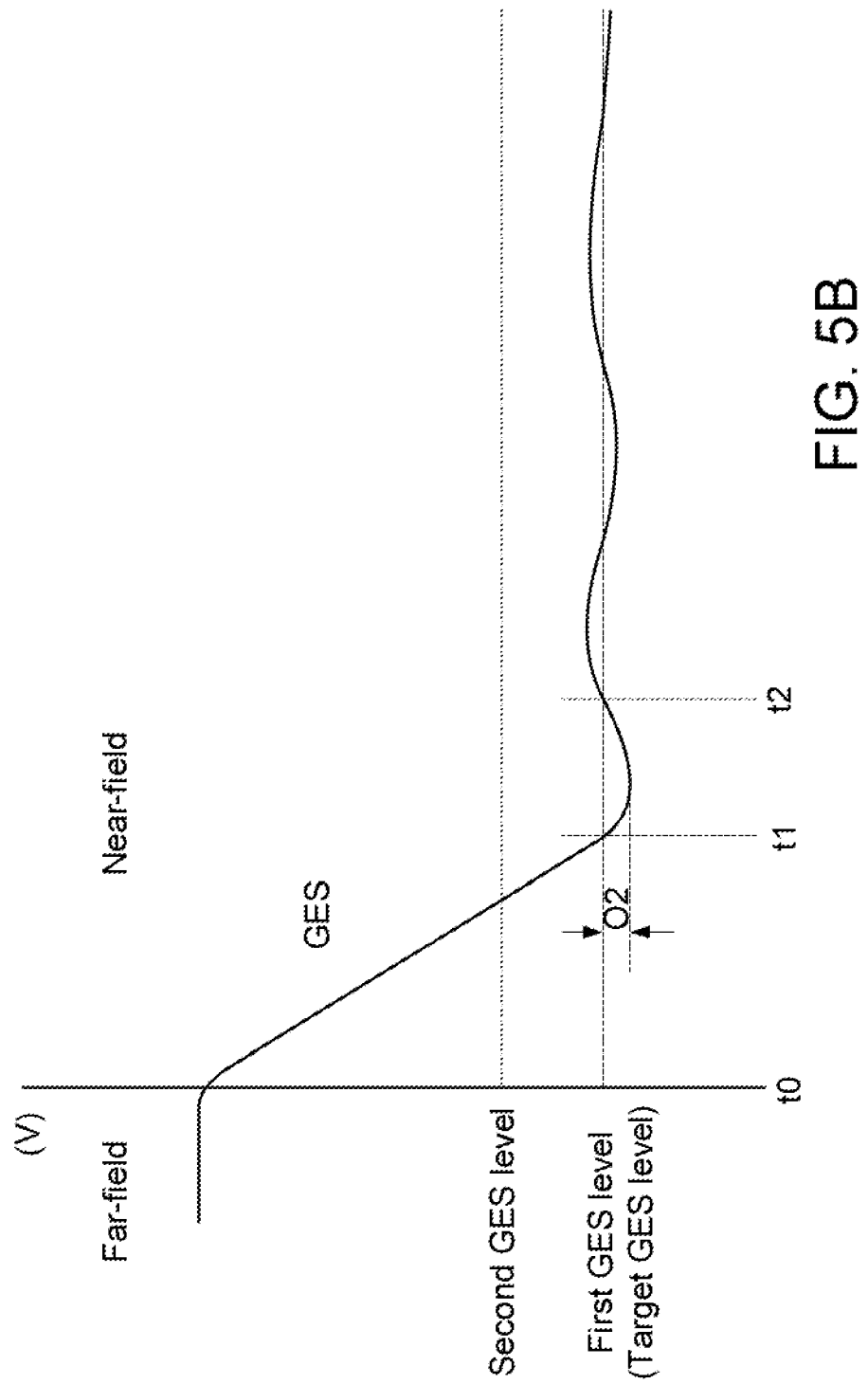

LENS PULL-IN METHOD FOR NEAR-FIELD OPTICAL ACCESSING SYSTEM

This application claims the benefit of People's Republic of China application Serial No. 201010166820.X, filed Apr. 23, 2010, the subject matter of which is incorporated herein by reference.

FIELD OF THE INVENTION

The present invention relates to a lens pull-in method, and more particularly to a lens pull-in method for a near-field optical accessing system.

BACKGROUND OF THE INVENTION

Recently, a near-field optical accessing system is a promising technology for accessing a large number of data. A near-field optical disc drive is one type of the near-field optical accessing system. Generally, the near-field optical disc drive has an optical head. During normal operation of the near-field optical disc drive at the near-field position, the gap distance between a lens (e.g. a solid immersion lens) of the optical head and a surface of an optical disc is very small (for example approximately 200 nm or less).

Therefore, it is critical to move the lens to the near-field working position without causing collision between the optical head and the surface of the optical disc. Generally, the action of moving the lens to the working position (or a target position) is called as a lens pull-in action.

FIG. 1 is a graph illustrating a gap error signal (GES) generated by a near-field optical disc drive during the lens is moved from a far-field range to a near-field range. That is, the GES is generated by moving the lens from a far position relative to the optical disc to the working position. In the far-field range, the GES is maintained at a constant level because the light reflected from the optical disc is not received by the optical head. Whereas, in the near-field range, as the gap distance between the lens and the optical disc decreases, the GES level decreases. Until the lens is in contact with the optical disc, the GES level is zero. In other words, the distance between the lens and the optical disc may be expressed by the GES level. According to the feature of the GES, many lens pull-in methods have been disclosed.

For example, US. Patent Publication No. 2009/0154309 discloses a near-field optical disc drive and a lens pull-in method thereof. FIGS. 2A and 2B are graphs respectively illustrating the GES and the driving voltage processed by the lens pull-in method disclosed in US. Patent Publication No. 2009/0154309. From the time spot t0 to the time spot t3, by controlling the driving voltage, the lens of the near-field optical disc drive is firstly moved toward the optical disc. According to the time spots t1 and t3 when the slope of the GES changes, a first gap error value Vges1, a second gap error value Vges2, a first voltage value Vd1 corresponding to the first gap error value Vges1 and a second voltage value Vd2 corresponding to the second gap error value Vges2 are determined. Then, the lens is driven to be away from the optical disc, and a target value Vtarget is set to be equal to the average of the first voltage value Vd1 and the second voltage value Vd2. At the time spot t4, by controlling the driving voltage, the lens of the near-field optical disc drive is moved toward the optical disc again. At the time spot t5, the lens is confirmed to enter the near-field range. At the time spot t6 when the driving voltage reaches the target value Vtarget, the controlling circuit of the driving voltage is switched to a gap servo system. The gap servo system is a close loop control system. When the gap servo system is performed, the lens is stably operated by the driving voltage at the target value.

That is, for performing the lens pull-in action, the lens should be adjusted from the far-field position to the near-field position in an open loop state, and the slope of the GES is monitored to judge whether the lens is located in the near-field position but not in contact with the optical disc. After the driving voltage reaches the target value Vtarget, the lens is moved to the target position corresponding to the target value Vtarget, and the controlling circuit is switched to the gap servo system. However, the use of the open loop control system and the target value Vtarget to implement the lens pull-in action to move the lens to the target position is time-consuming.

Moreover, US. Patent Publication No. 2009/0290465 discloses another near-field optical disc drive and a lens pull-in method thereof. FIG. 3 is a graph illustrating associated signals processed by the lens pull-in method disclosed in US. Patent Publication No. 2009/0290465. As shown in FIG. 3, from the time spot t0 to the time spot t3, the near-field optical disc drive is operated in an open loop control state. According to the driving voltage, the lens is gradually moved toward the surface of the optical disc and reaches a target distance. According to the GES, it is found that the lens is in the far-field range from the time spot t0 to the time spot t1. In this situation, the lens is controlled to be moved toward the surface of the optical disc at a first moving speed according to the driving voltage. At the time spot t1 when the GES decreases to a first GES level, it is found that the lens enters the near-field range. Meanwhile, the lens is separated from the optical disc by a first distance. In this situation, the lens is controlled to be moved toward the surface of the optical disc at a second moving speed according to the driving voltage. At the time spot t2 when the GES decreases to a second GES level, the lens is separated from the optical disc by a second distance. In this situation, the lens is controlled to be moved toward the surface of the optical disc at a third moving speed according to the driving voltage. At the time spot t3 when the GES reaches a target GES level, the distance between the lens and the surface of the optical disc is the target distance. At the same time, the near-field optical disc drive is switched to a close loop control state. In addition, an inverse driving voltage having a pulse duration T and a pulse amplitude A is generated in order to prevent the optical disc from colliding with the lens. After the time spot t3, the optical disc drive is operated in a close loop control state, so that the lens is separated from the surface of the optical disc by the target distance. However, it is time-consuming to implement the lens pull-in action to move the lens to the target position according to several driving voltages when the near-field optical disc drive is operated in the open loop control state.

Similarly, US. Patent Publication No. 2009/0016179 also discloses a method of implementing the lens pull-in action by the open loop control system. This lens pull-in method is similar to that of the above literatures, and is not redundantly described herein.

Generally, for driving the lens in the open loop control state, the optical disc needs to be stationary. If the lens pull-in action is performed in the open loop control state to move the lens toward the rotating optical disc, a tiny disturbance of the optical disc may result in damage of the optical disc and the lens.

SUMMARY OF THE INVENTION

Therefore, the present invention provides a lens pull-in method for implementing a lens pull-in action in a close loop control state, in which the lens pull-in action is performed according to plural target positions so as to prevent the optical disc from colliding with the lens.

In accordance with an aspect, the present invention provides a lens pull-in method for a near-field optical accessing system. Firstly, when a lens is in a far-field range, the lens is driven to approach a surface of an optical disc in an open loop control state. If the lens enters a near-field range, a first gap error signal level is inputted as a set value and the open loop control state is switched to a close loop control state to drive the lens. When the gap error signal decreases to the first gap error signal level, the set value is changed from the first gap error signal level to a second gap error signal level, wherein the second gap error signal level is higher than the first gap error signal level. When the gap error signal increases to the first gap error signal level, the set value is changed from the second gap error signal level to a target gap error signal level, so that the gap error signal is maintained at the target gap error signal level.

In accordance with another aspect, the present invention provides a lens pull-in method for a near-field optical accessing system. Firstly, when a lens is in a near-field range, the lens is driven to approach a surface of an optical disc in a close loop control state, so that the a gap error signal is maintained at an original target gap error signal level. If the lens is intended to be moved to a final target position corresponding to a final target gap error signal level in the close loop control state, a transient gap error signal level is inputted as a set value, so that the gap error signal is changed from the original target gap error signal level to near the transient target gap error signal level. When a slope of the gap error signal is equal to a predetermined slope value, the set value is changed from the transient gap error signal level to the final target gap error signal level, so that the gap error signal is maintained at the final target gap error signal level.

In accordance with another aspect, the present invention provides a lens pull-in method for a near-field optical accessing system, the lens pull-in method comprising steps of: driving a lens of the near-field optical accessing system to approach a surface of an optical disc in an open loop control state when the lens is in a far-field range, and judging whether the lens enters a near-field range according to a gap error signal; driving the lens to approach the surface of the optical disc in the open loop control state if the lens enters the near-field range; driving the lens to be away from the surface of the optical disc in the open loop control state when the gap error signal decreases to a first gap error signal level; and inputting a second gap error signal level as a set value and switching the open loop control state to a close loop control state when a slope of the gap error signal is equal to a predetermined slope value, so that the gap error signal is maintained at the second gap error signal level.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 5B is a graph illustrating a gap error signal processed by the lens pull-in method according to the first embodiment of the present invention;

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
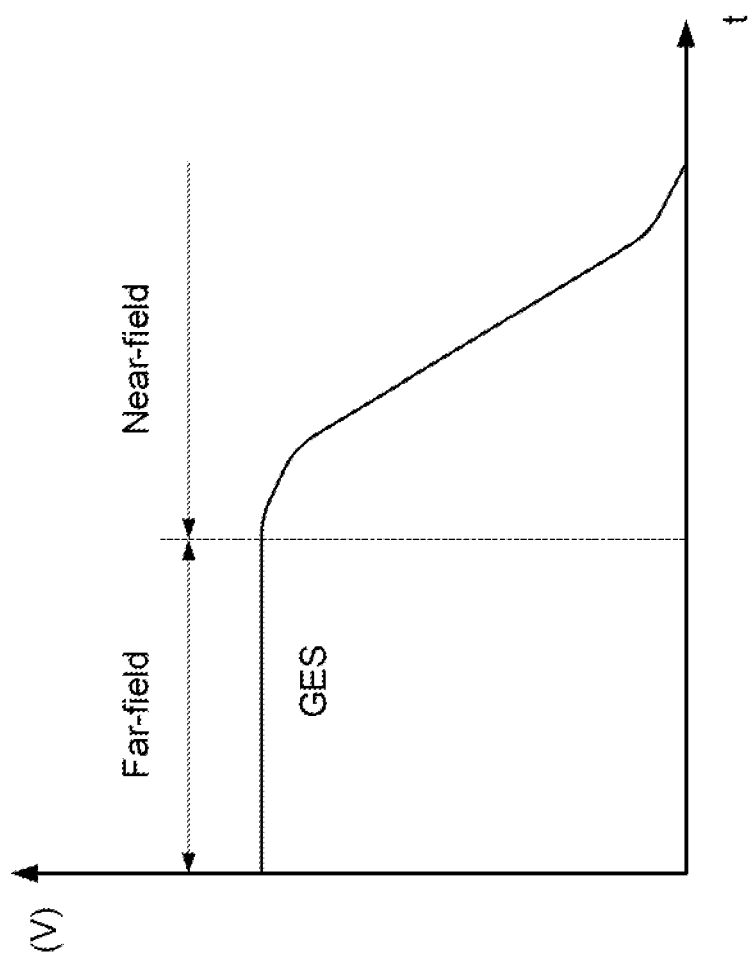
FIG. 1 is a graph illustrating a gap error signal generated by a near-field optical disc drive during the lens is moved from a far-field position to a near-field position.
Figure 2:
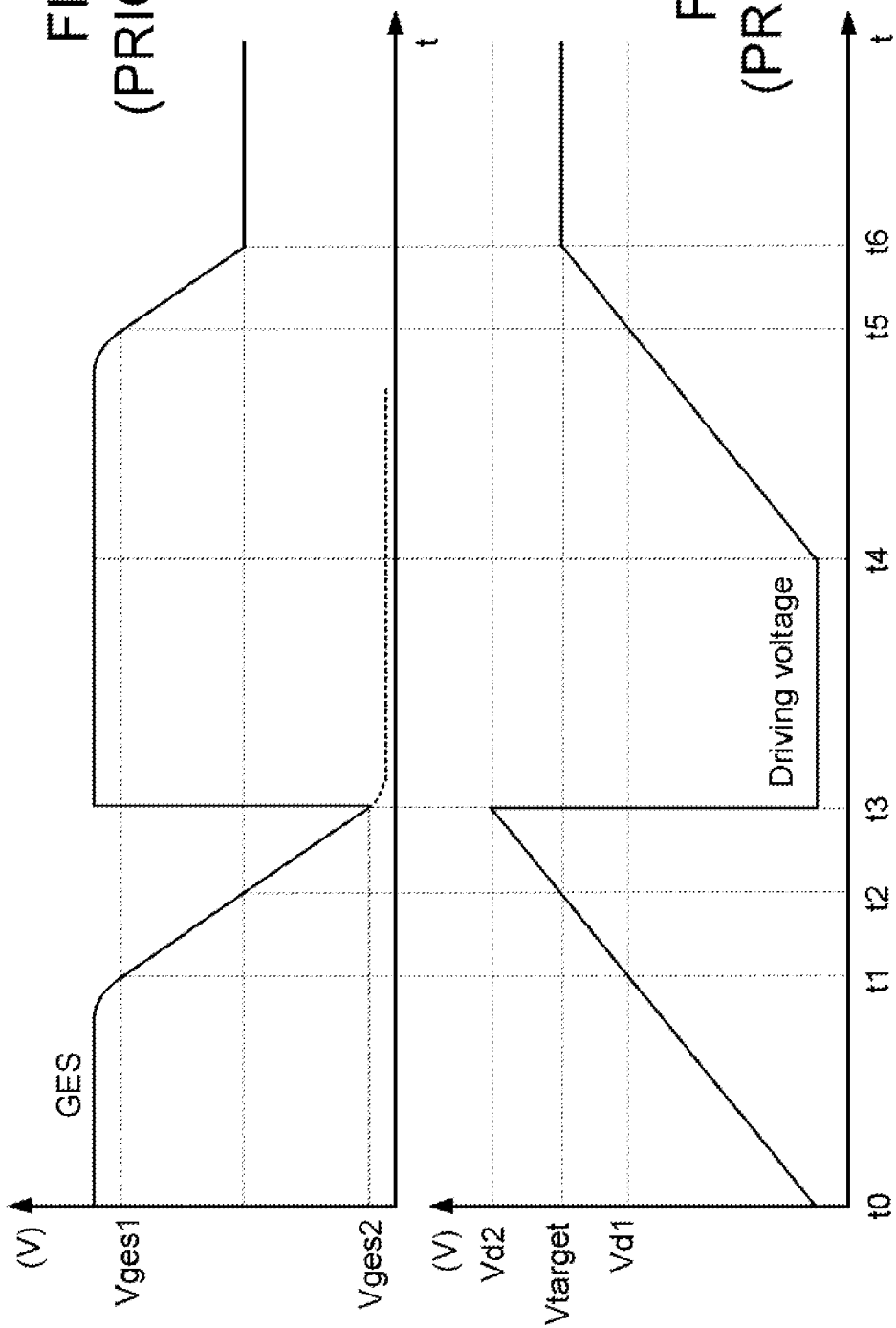
FIGS. 2A and 2B are graphs respectively illustrating the GES and the driving voltage processed by a conventional lens pull-in method.
Figure 3:
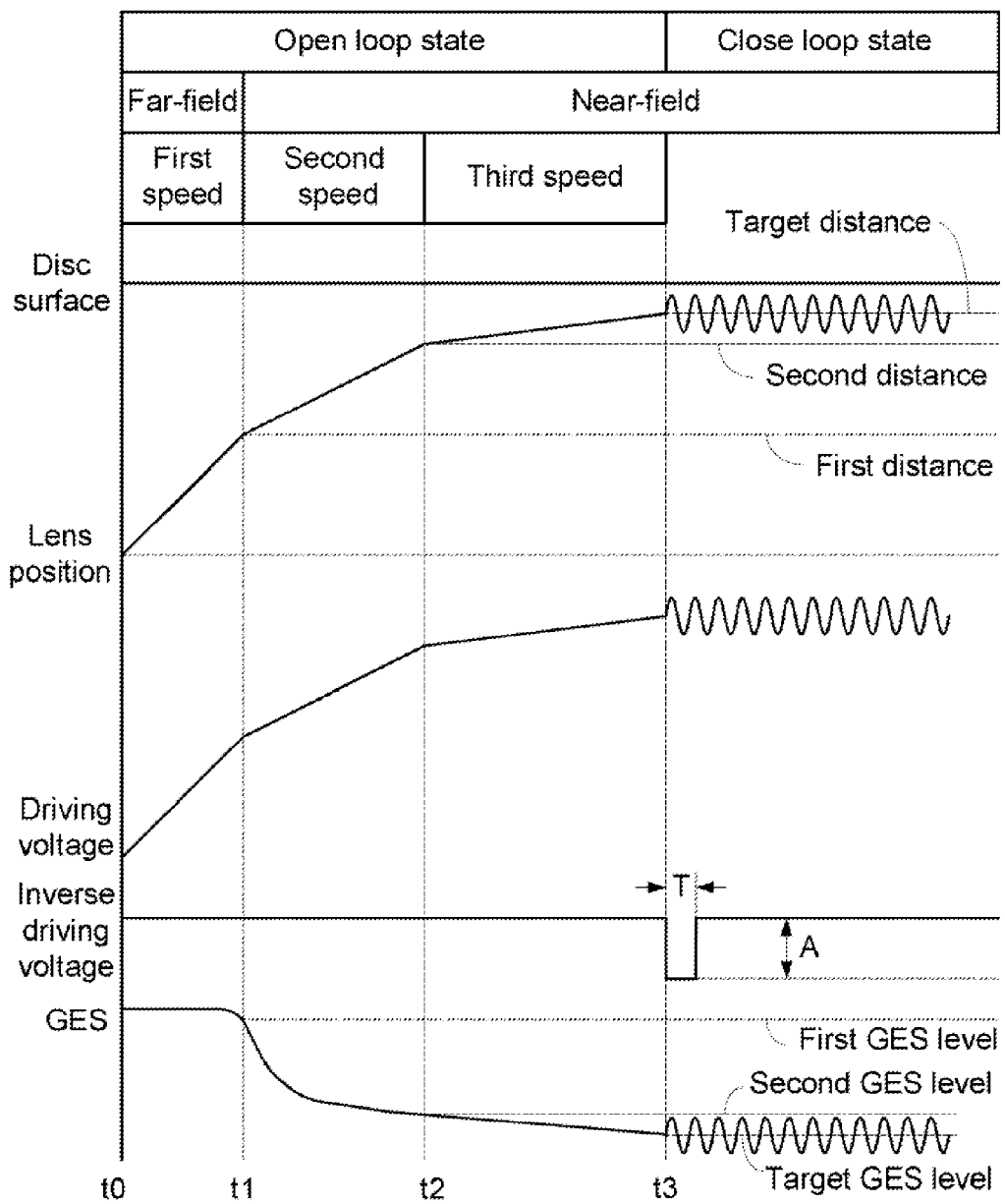
FIG. 3 is a graph illustrating associated signals processed by another conventional lens pull-in method.

As previously described in FIG. 1, after the lens is moved within the near-filed range, the GES varies linearly. Due to the linear change of the GES, after the lens enters the near-filed range, the controlling circuit is switched to gap servo system. Moreover, in the close loop control state, the lens can be quickly moved to the target position in order to implement the lens pull-in action.

Figure 4:
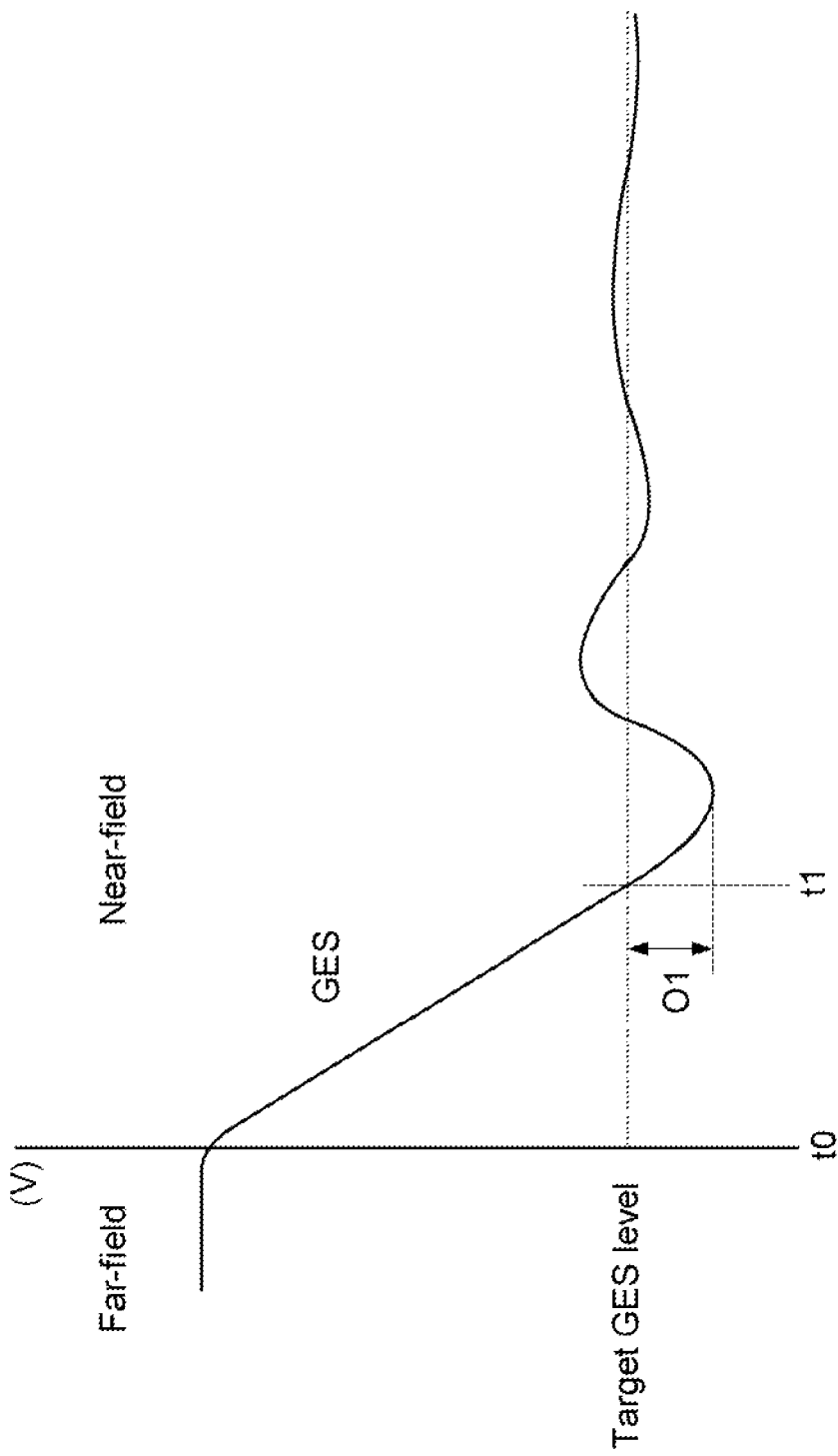
FIG. 4 is a graph illustrating a gap error signal obtained by performing a lens pull-in action in a close loop control state according to the present invention.

FIG. 4 is a graph illustrating a gap error signal obtained by performing a lens pull-in action in a close loop control state. Since the driving voltage of the lens and the GES have a specified relationship when the lens is in the near-filed range and the near-field optical disc drive is operated in a close loop control state, only the GES is described hereinafter. Firstly, the lens is in the far-field range, the near-field optical disc drive is operated in an open loop control state to move the lens toward the surface of the optical disc. At the time spot t0 when the GES starts to decrease, the near-field optical disc drive realizes that the lens enters the near-field range. Meanwhile, a target GES level is set by the near-field optical disc drive, and the controlling circuit is switched to a gap servo system (i.e. a close loop control system). In the close loop control system, a driving voltage is generated to quickly control the movement of the lens such that the distance between the lens and the surface of the optical disc is maintained at the target distance. That is, the GES is maintained at the target GES level. When the distance between the lens and the surface of the optical disc is maintained at the target distance, it means that the lens pull-in action is completed.

However, since the target distance between the lens and the surface of the optical disc is very small (for example approximately 200 nm~250 nm), the above lens pull-in action may result in a large overshoot. Under this circumstance, the distance between the lens and the surface of the optical disc is smaller than the target distance. The large overshoot may cause collision between the optical head and the surface of the optical disc. As shown in FIG. 4, the GES reaches the target GES level at the time spot t1. After the time spot t1, an overshoot O1 occurs. If the overshoot O1 is too large, the optical disc may collide with the lens. Moreover, if the lens approaches a rotating optical disc, a larger overshoot O1 may result in damage of the optical disc and the lens. Therefore, there is a need of providing a lens pull-in method to avoid overshoot by using a close loop control state to adjust the GES.

Figure 5A:
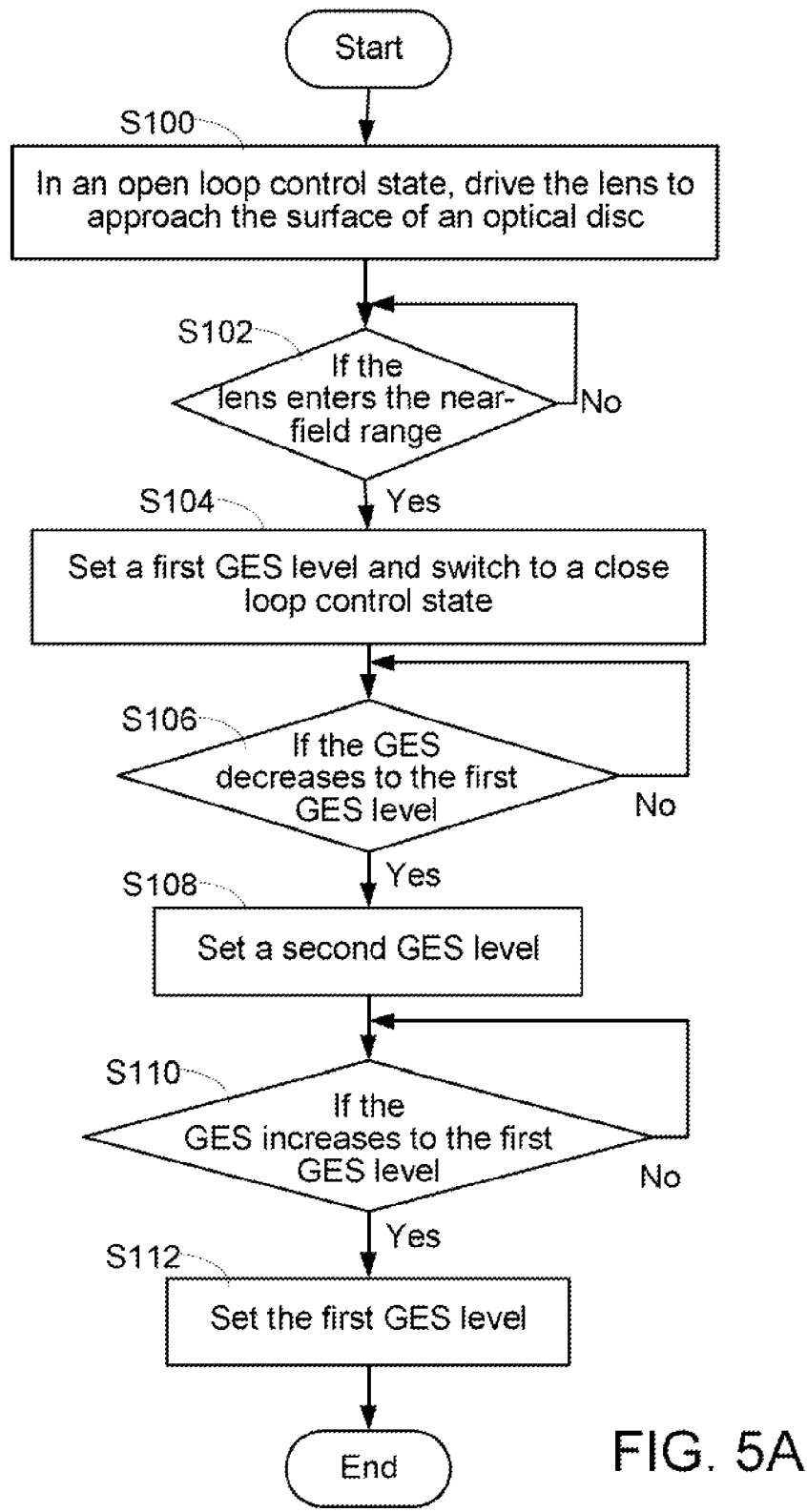
FIG. 5A is a flowchart illustrating a lens pull-in method according to a first embodiment of the present invention.

FIG. 5A is a flowchart illustrating a lens pull-in method according to a first embodiment of the present invention. The lens pull-in method is applied to a near-field optical accessing system (e.g. a near-field optical disc drive). Firstly, the near-field optical disc drive is operated in an open loop control state to drive the lens to approach the surface of an optical disc (Step S100). Then, Step S102 is performed to judge whether the lens enters the near-field range according to a change of the GES. If the near-field optical disc drive confirms that the lens enters the near-field range, a first gap error signal level (a first GES level) is set as a target GES level by the near-field optical disc drive and the near-field optical disc drive is switched to a close loop control state (Step S104). Then, the GES is continuously detected. When the GES decreases to the first GES level (Step S106), a second gap error signal level (a second GES level) is set as the target GES level by the near-field optical disc drive (Step S108). The second GES level is a transient target GES level and higher than the first GES level. Then, the GES is continuously detected. When the GES increases to the first GES level (Step S110), the first GES level is set as the target GES level again by the near-field optical disc drive (Step S112).

FIG. 5B is a graph illustrating a gap error signal processed by the lens pull-in method according to the first embodiment of the present invention. Firstly, the lens is in the far-field range, and the lens is moved toward the surface of an optical disc in an open loop control state. At the time spot t0 when the GES starts to decrease, the near-field optical disc drive realizes that the lens enters the near-field range. Meanwhile, a first GES level is set as a target GES level by the near-field optical disc drive, and the near-field optical disc drive is switched to a gap servo system (i.e. a close loop control system). In the close loop control state, the lens is quickly moved, and thus the GES quickly decreases. At the time spot t1, the near-field optical disc drive confirms that the GES decreases to the first GES level, and thus a second GES level is set as the target GES level by the near-field optical disc drive.

Obviously, after the target GES level is changed to the second GES level, the level difference between the GES and the second GES level increases. For approaching the GES to the second GES level, the close loop control system will generate a higher driving voltage to move the lens in a direction away from the surface of the optical disc. In such way, the overshoot is effectively reduced from O1 (see FIG. 4) to O2, thereby preventing the lens from colliding the optical disc.

At the time spot t2, the near-field optical disc drive confirms that the GES increases to the first GES level, and thus the first GES level is set as the target GES level again by the near-field optical disc drive. After the time spot t2, the driving voltage generated from the gap servo system will control the movement of the lens such that the distance between the lens and the surface of the optical disc is maintained at the target distance. That is, the GES is maintained at the target GES level. When the distance between the lens and the surface of the optical disc is maintained at the target distance, it means that the lens pull-in action is completed.

In the first embodiment, the first GES level is equal to the target GES level, and the second GES level is 1.2 times the first GES level. Alternatively, the first GES level is near the target GES level, and the ratio of the second GES level to the first GES level may be adjusted as long as the purpose of reducing the overshoot is achieved. In some embodiments, more than two GES levels may be used to stepwise adjust the GES to the target GES level.

In some circumstances, after the lens pull-in action is performed to move the lens to the target position, the lens may be moved to another target position because of some reasons. For example, when the near-field optical disc drive is operated in the close loop control state, the lens needs to be moved from an original target position (e.g. 100 nm) to a final target position (e.g. 25 nm). This object will be achieved by a lens pull-in method according to a second embodiment of the present invention.

Figure 6A:
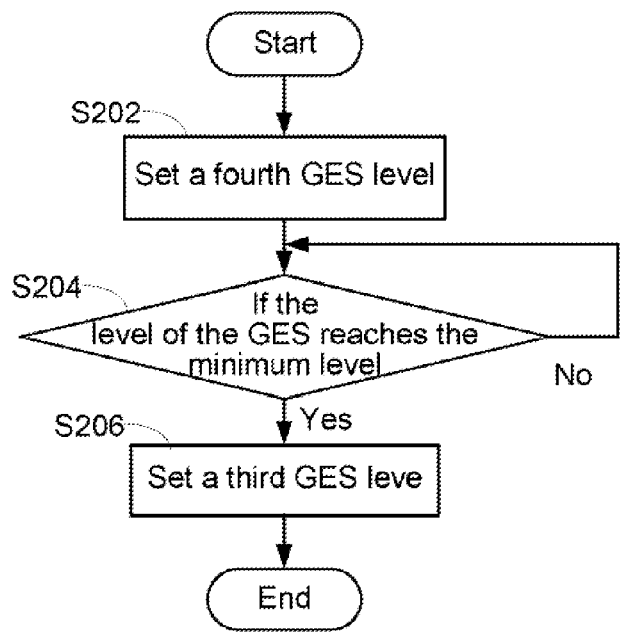
FIG. 6A is a flowchart illustrating a lens pull-in method according to a second embodiment of the present invention.

FIG. 6A is a flowchart illustrating a lens pull-in method according to a second embodiment of the present invention. In this embodiment, the lens is moved in a close loop control state to change the target level from the first GES level (i.e. an original target GES level) to a third GES level (i.e. a final GES level). Firstly, the set value of the target GES level is changed from the first GES level to a fourth GES level by the near-field optical disc drive (Step S202). The fourth GES level is a transient GES level between the first GES level and the third GES level. Then, the GES is continuously detected. Then, Step S204 is performed to judge whether the GES reaches the minimum level. If the near-field optical disc drive confirms that the GES reaches the minimum level, the set value of the target GES level is changed from the fourth GES level to the third GES level (Step S206). The third GES level is the final GES level.

Figure 6B:
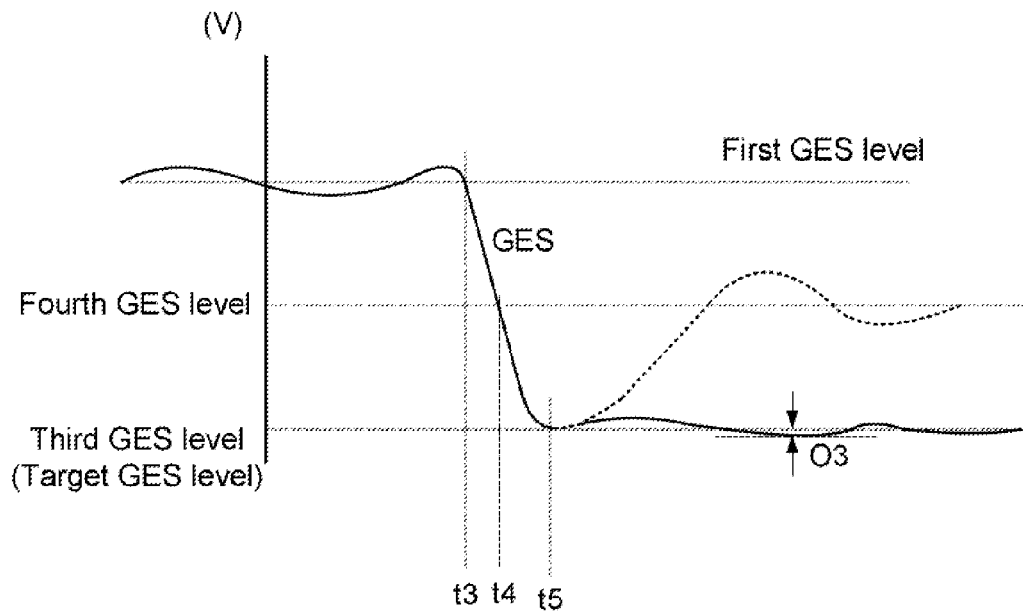
FIG. 6B is a graph illustrating a gap error signal processed by the lens pull-in method according to the second embodiment of the present invention.

FIG. 6B is a graph illustrating a gap error signal processed by the lens pull-in method according to the second embodiment of the present invention. At the time spot t3, the set value of the target GES level is changed from the first GES level (i.e. an original target GES level) to the fourth GES level by the near-field optical disc drive. In the close loop control state, the lens is quickly moved, and thus the GES quickly decreases. At the time spot t4, the GES decreases to the fourth GES level. After the time spot t4, the GES continuously decreases, and thus an overshoot occurs. If the set value of the target GES level is maintained at the fourth GES level, the GES will reach the fourth GES level along the dotted curve.

Please refer to FIG. 6B again. At the time spot t5, the highest overshoot occurs. Since the slope of the GES is zero, the near-field optical disc drive realizes that the GES reaches the minimum level. That is, the moving speed of the lens is zero at the time spot t5. At the same time, the set value of the target GES level is changed from the fourth GES level to the third GES level (i.e. the final GES level). After the time spot t5, a small overshoot O3 occurs. In addition, the driving voltage generated from the gap servo system will control the movement of the lens such that the distance between the lens and the surface of the optical disc is maintained at the final target distance. That is, the GES is maintained at the third GES level (i.e. the final GES level).

In the second embodiment, the fourth GES level is an average of the first GES level and the third GES level, and the third GES level is the minimum level of the GES. Of course, according to the step response of the near-field optical disc drive, the fourth GES level may be any value between the first GES level and the third GES level. If the overshoot of the step response is greater than a threshold value, the fourth GES level is greater than the average of the first GES level and the third GES level. Whereas, if the overshoot of the step response is smaller than the threshold value, the fourth GES level is smaller than the average of the first GES level and the third GES level. Alternatively, in some embodiments, when the slope of the GES is close to a predetermined value, the purpose of reducing the overshoot may be achieved by changing the set value of the target GES level from the fourth GES level to the third GES level.

Figure 7A:
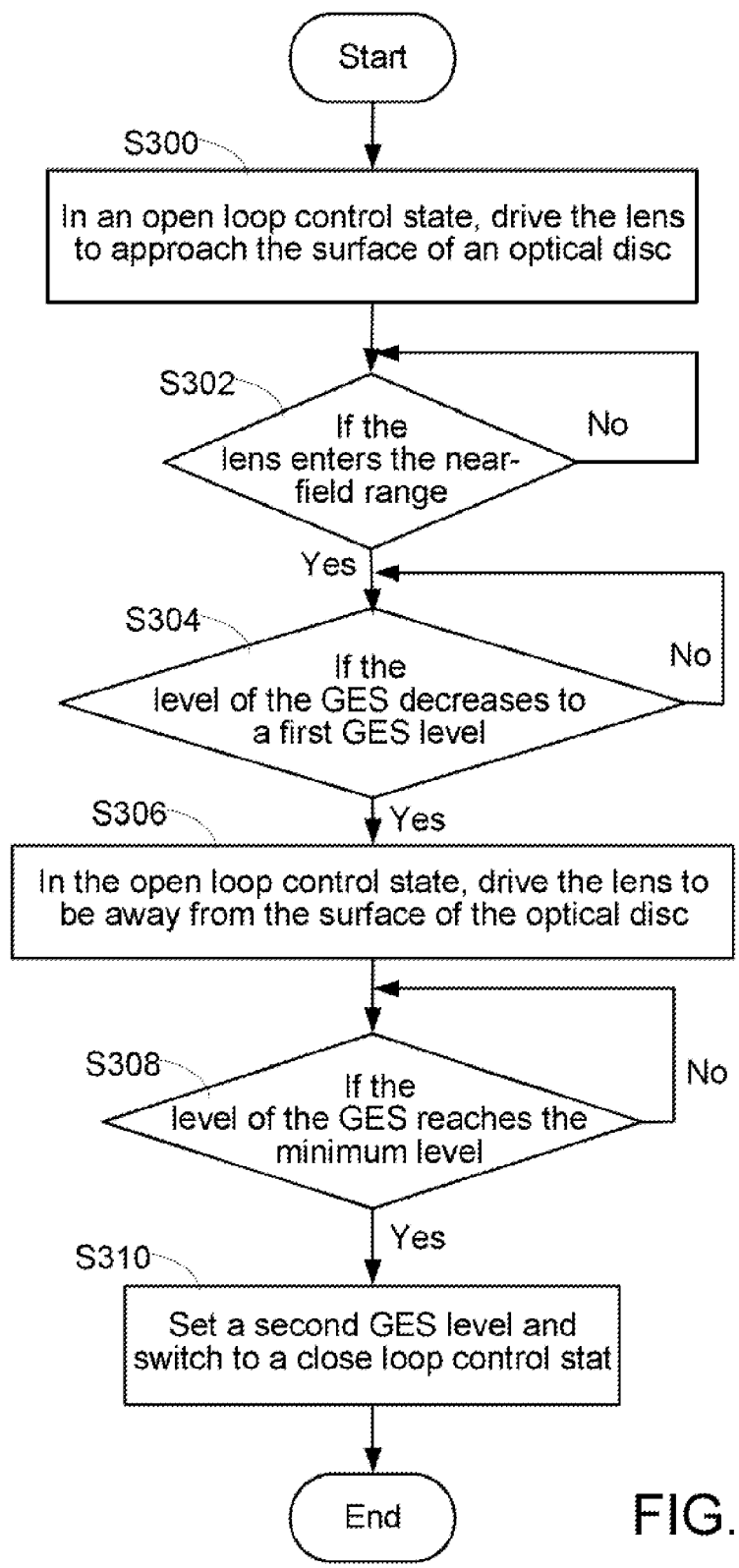
FIG. 7A is a flowchart illustrating a lens pull-in method according to a third embodiment of the present invention.

FIG. 7A is a flowchart illustrating a lens pull-in method according to a third embodiment of the present invention. Firstly, the near-field optical disc drive is operated in an open loop control state to drive the lens to be moved toward the surface of an optical disc (Step S300). Then, Step S302 is performed to judge whether the lens enters the near-field range according to a change of the GES. If the near-field optical disc drive confirms that the lens enters the near-field range, the driving voltage generated in the open loop control state is continuously used to drive the lens to approach the surface of the optical disc. The GES is continuously detected. When the GES decreases to a first GES level (Step S304), an inverse driving voltage generated in the open loop control state is used to move the lens in a direction away from the surface of the optical disc (Step S306). Then, the GES is continuously detected. When the GES decreases to the minimum level (Step S308), a second GES level is set as a target GES level by the near-field optical disc drive, and the controlling circuit is switched to a close loop control state (Step S310).

Figure 7B:
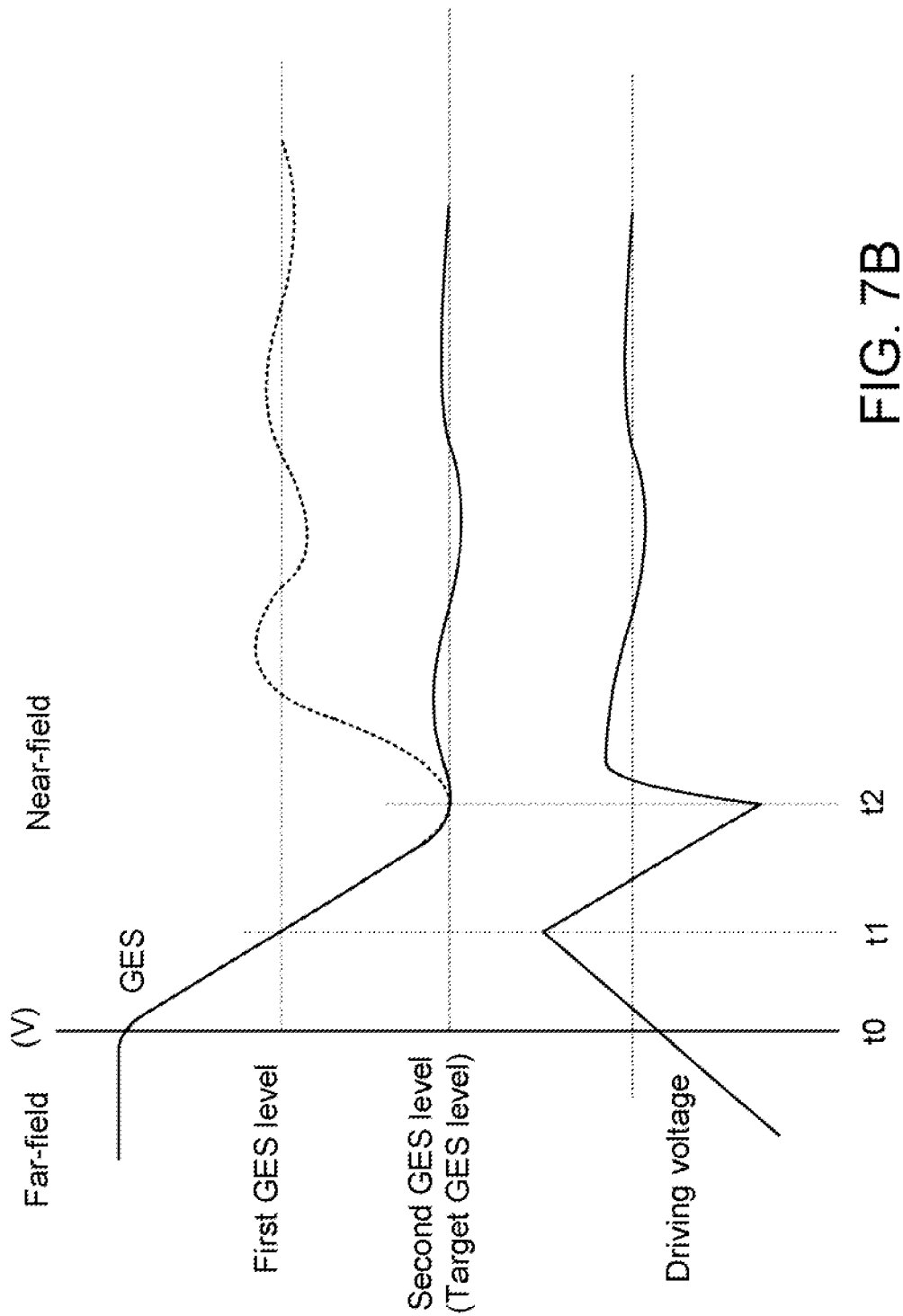
FIG. 7B is a graph illustrating associated signals processed by the lens pull-in method according to the third embodiment of the present invention.

FIG. 7B is a graph illustrating associated signals processed by the lens pull-in method according to the third embodiment of the present invention. Firstly, the lens is in the far-field range, and the lens is moved toward the surface of an optical disc in an open loop control state. As shown in FIG. 7B, since the driving voltage is a ramp signal, it means that the lens is moved to the surface of the optical disc at a fast speed. At the time spot t0 when the GES starts to decrease, the near-field optical disc drive realizes that the lens enters the near-field range. At the time spot t1 when the GES decreases to a first GES level, an inverse driving voltage generated in the open loop control state is used to create a braking action, so that the lens is moved in a direction toward the surface of the optical disc and the moving speed is gradually decreased. At the time spot t2, since the slope of the GES is zero, the near-field optical disc drive realizes that the GES reaches the minimum level (second GES level). That is, the moving speed of the lens is zero at the time spot t2. At the same time, a second GES level is set as a target GES level by the near-field optical disc drive, and the controlling circuit is switched to a close loop control state. After the time spot t2, the driving voltage generated from the gap servo system is used to control the movement of the lens, so that the distance between the lens and the surface of the optical disc is maintained at the target distance along the solid curve. In addition, since the GES is maintained at the second GES level, it means that the lens pull-in action is completed.

On the other hand, if the controlling circuit is switched to the close loop control state but the first GES is set as the target GES level, the GES will reach the first GES level along the dotted curve.

In the third embodiment, the second GES level is the minimum level of the GES. Alternatively, in some embodiments, the second GES level is close to the minimum level of the GES.

From the above description, the lens pull-in method of the present invention is capable of implementing a lens pull-in action in a close loop control state, thereby effectively reducing the overshoot and preventing the lens of the near-field optical accessing system from colliding with the surface of the optical disc. In addition, the lens can be quickly moved to the target position.

Moreover, since the lens pull-in action is implemented in the close loop control state, even if the lens is moved toward a rotating optical disc during the lens pull-in action, the problem of causing collision between the lens and the surface of the optical disc will be eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lens pull-in method, comprising steps of:
driving a lens towards an optical disc in an open loop control state when the lens is in a far-field range;
determining whether the lens enters a near-field range;
switching to a close loop control state to drive the lens to aim at a targeting gap error signal level once the lens enters the near-field range at a first time point;
setting the targeting gap error signal to a first level at the first time point, and driving the lens to aim at the first level during a first time period, wherein the first time period starts from the first time point and ends at a second time point;
setting the target gap error signal to a second level at the second time point, and driving the lens to aim at the second level during the a second time period, wherein the second time period starts from the second time point and ends at a third time point, the second level is higher than the first level, the lens reaches to the first level at the second time point, and the lens overshoots the first level during the second time period;
and
setting the target gap error signal back to the first level at third time point, and driving the lens to aim at the first level during the a third time period, wherein the third time period starts from the third time point, the lens reaches to the first level at the third time point.

2. The lens pull-in method according to claim 1, wherein the second level is 1.2 times the first level.

* * * * *